Aug. 23, 1932. L. D. JONES 1,873,597
SEPARATION OF OIL FROM MIXTURES THEREOF WITH WATER
Filed May 18, 1928
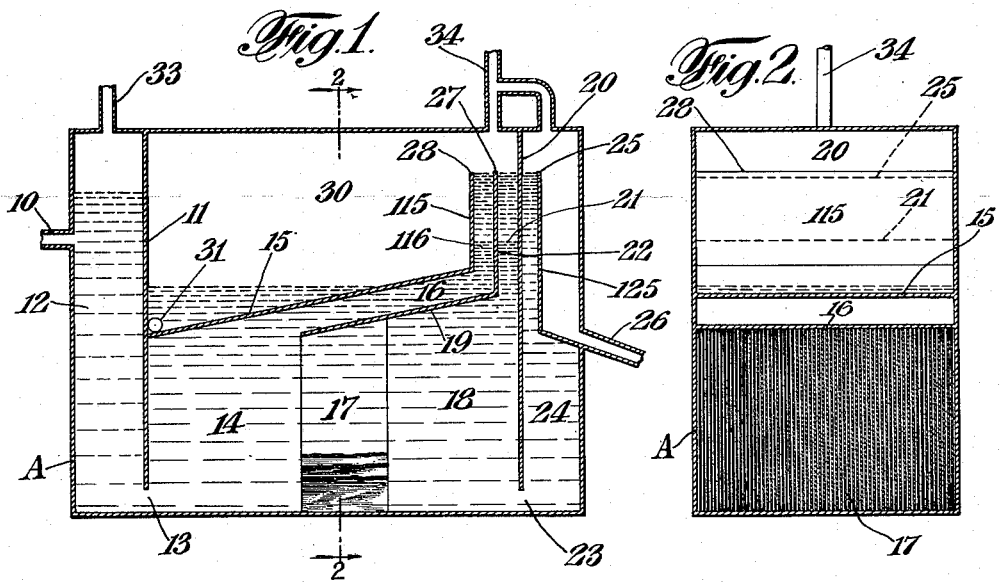
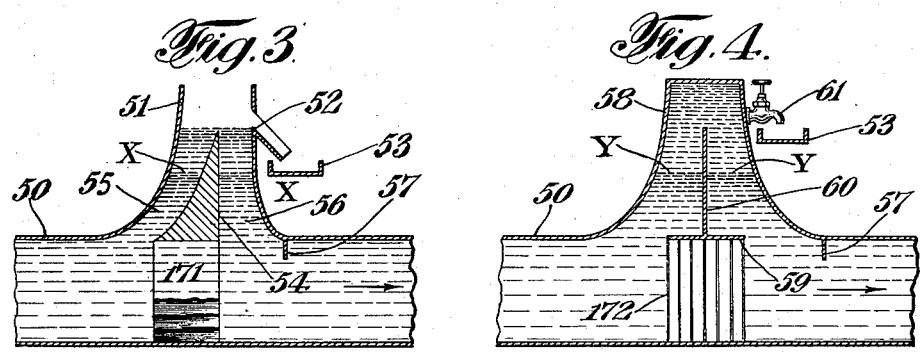
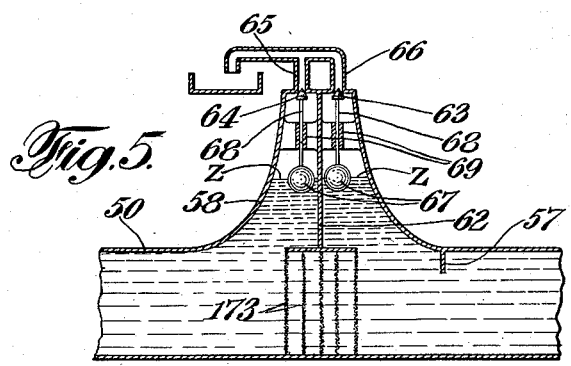
Inventor
Leo D. Jones
By his Attorneys
Kenyon & Kenyon Patented Aug. 23, 1932

1,873,597

UNITED STATES PATENT OFFICE

LEO D. JONES, OF PHILADELPHIA, PENNSYLVANIA, ASSIGNOR TO THE SHARPLES SPECIALTY COMPANY, OF PHILADELPHIA, PENNSYLVANIA, A CORPORATION OF DELAWARE

SEPARATION OF OIL FROM MIXTURES THEREOF WITH WATER

Application filed May 18, 1928. Serial No. 278,742.

This invention relates to the separation of oil from mixtures thereof in various proportions with water and it possesses features whereby even small quantities of oil in finely divided globules dispersed through water or in films on water may be separated from the water although the oil forms but a very small fraction of the mixture.

When oil or oily substances are in finely divided particles in a body of water, and particularly when the specific gravity of the oil or oily particles is near or about unity, the separation of such particles of oil from the water by gravity is very slow or may require relatively expensive apparatus and may be impracticable. It is difficult to separate rapidly from large quantities of water proportions of oil that are small but great enough to produce films on the surface of bodies of water into which such impure water is discharged. If large quantities of such mixtures are to be handled rapidly separation by known methods is unduly slow or expensive according to the methods employed. For example, in the discharging of ballast water, particularly ballast water from the oil storage tanks of oil-burning ships, a hundred tons or more of mixture must be handled per hour. A considerable proportion of the oil may be separated from such water rapidly by known methods but the quantities of mixture involved are so great that the proportion of oil in the treated water must be less than one part of oil in ten thousand parts of water to avoid discharge of twenty gallons of polluting oil with each thousand tons of water discharged. One part of oil in two hundred thousand parts of water is a desirable standard.

The filtration of water coming from a gravity separator, for the purpose of approaching such a standard, is objectionable because of the cost of replacement or difficulty in cleaning such filters. Centrifugal separation at such a rate would require much equipment that would be idle for long periods.

My invention has features adapting it to the purification of ballast water and it may be used alone or in conjunction with other proposed methods of purifying ballast water. It is to be understood, however, that it is also of general application.

It is an object of my invention to provide a method and apparatus whereby oil may be removed from water with which it is mixed, and whereby even small proportions of oil dispersed in fine particles may be removed from water, rapidly and economically and by the use of simple apparatus.

An important feature of my invention resides in passing the oil-containing water through spaces so narrow that dispersed particles of oil will be caused by impact or by contact under various pressures to coalesce and form globules or other bodies of oil that are readily separable from the water and readily removable therefrom by gravity. The method and apparatus embodying this feature of my invention may be combined, within the spirit of my invention, with other steps or features of apparatus whereby a proper flow of mixture and a proper withdrawal of separated constituents are effected. Other important features of my invention reside in the provision of means and steps whereby oil collected or separated from water or agglomerated by the passage of mixture through narrow spaces may be withdrawn for desired disposal.

Other important features of my invention reside in the provision of steps and apparatus whereby a mixture may be subjected to gravity separation to effect a coarse or bulk removal of oil that can be carried out rapidly and continuously, and whereby the water containing small proportions of oil may be passed through narrow spaces to effect further removal of oil. A feature of such steps and apparatus is that the control of discharge of separated constituents is effected by liquid balance; and a further feature is that the various separating operations, also including in some cases a withdrawal of gases from the mixture, are effected while the mixture and its constituents are under liquid balance.

In the drawing in which like reference characters indicate similar parts,

Fig. 1 shows, diagrammatically, in vertical section, apparatus embodying my invention and whereby my process may be practised;

Fig. 2 is a partial cross-section on the line 2—2 of Fig. 1; and

Figs. 3, 4, and 5 show, diagrammatically, in section simplified forms of apparatus embodying my invention and whereby my process may be practised.

My invention is applicable to the saparation of immiscible liquids generally but it will be described, for the purpose of facilitating the understanding thereof and with the intention that it is not limited thereto, in connection with the separation of oil from water and particularly the separation of oil from ballast or bilge water of ships.

In Fig. 1 the casing A is provided with an inlet 10 for mixtures of immiscible liquids such as mixtures of water and oily particles, including emulsion, that occur in ballast and bilge water. For the venting of air or gas a partition 11 may form with the end of chamber A an inlet and gas-separating compartment 12; and mixture enters casing A through inlet 10 at a point that is at or below but near the surface of liquid in that compartment. Oily water then passes through passage 13 below partition 11 into compartment 14 across the top of which extends partition 15 having an upwardly extending portion 115. Oil rising in that compartment will flow into passages 16 and 116. Water containing whatever oil does not separate therefrom by gravity in compartment 14 passes between plates 17 which as shown in Fig. 2 are so close together that the smallest particles of oil which it is desired to remove will contact with the plates which are usually coated with oil preliminarily or through use of the apparatus. Thus small globules of oil will be caused to coalesce or will be caused to adhere to the plates and form films on the surface thereof which will creep up under the action of gravity. Compartment 18 formed by partition 19 which extends over the top of plates 17 and by partition 20 that extends down from the top of chamber A will receive water that has passed between the plates 17. Oil that is caused to separate out by the passage of mixture between plates 17 will pass into oil passages 16 and 116 or move along the under side of partition 19 and into oil passage 21 that is formed between partition 20 and partition 22 that extends upwardly from partition 19.

Oil-freed water passes through passage 23 below partition 20 and rises in outlet compartment 24 between partition 20 and the end of casing A and passes over weir 25, at the upper edge of partition 125, that controls the level of water in that compartment, and is discharged through pipe 26. Weirs 27 and 28 control the level of oil respectively in passages 21 and 116. The relative levels of weirs 25, 27 and 28 is such that liquid balance is maintained on opposite sides of partition 20, and the discharge of oil or oily matter and water is so regulated by adjustment of the levels of those weirs that the dividing line between oil and water is preferably maintained in the narrow passage 21 and at a corresponding point in passage 116. Oil passing over weirs 27 and 28 is collected in compartment 30 and withdrawn therefrom through pipe 31. Vents 33 and 34 provide for the removal of gas from chamber A and for the equalizing of pressure on opposite sides of partition 20. In the construction shown in Fig. 1 partitions 11, 15, 19, 20, 27 and 125 extend all the way across casing A but the outlet passages leading to the several weirs may be of any configuration suitable to the purpose.

While the means for causing removal of small proportions of oil, as by agglomeration of fine particles thereof, is illustrated in Fig. 1 as a series of closely positioned plates, it is to be understood that elements of other configuration may be employed so long as spaces are sufficiently narrow to cause agglomeration of fine particles and sufficiently free to permit continuous operation without creating such a differential of pressure on opposite sides of the agglomerating means as to interfere with the separating operation.

The removal of oil from water may be carried out by a continuous flow of the mixture through or against similar agglomerating means, preferably with provision for withdrawal of oil. Thus in the constructions shown in Figs. 3, 4 and 5, the mixture may be passed along a conduit 50 and acted upon by agglomerating means 171, 172 or 173 as it flows along. The agglomerating means may assume any effective form, the agglomerating means 171 being a series of plates similar to the plates 17 and the agglomerating means 172 being one or more rows of vertically arranged substantially parallel wires, the agglomerating means 173 being one or more sheets of wire gauze of suitable fineness.

In the construction shown in Fig. 3 the conduit is provided with an open upward extension 51 that is provided with a weir 52 from which oil discharges into a collecting vessel 53. The closed or solid dividing-member 54 closes the spaces between the upper edges of the plates and extends upward into the upward extension 51 to suitable height to prevent flow of mixture over the top of agglomerating means 171. The device shown in Fig. 3 may be operated when the pressure is such that the dividing line between oil and water will lie in the passages 55 and 56 between the walls of the upward extension 51 and the member 54, for example at X—X. A deflecting plate 57 may be employed to prevent oil separated by the agglomerating means from passing along the conduit, the flow being in the direction of the arrow.

The construction shown in Fig. 4 for withdrawal of oil may be employed when the mixture flowing in the direction of the arrow is under pressure. The conduit is provided with a closed upward extension 58 and from a plate 59 located at the top of the agglomerating means extends a partition 60 to prevent flow of mixture past the agglomerating means. Oil rising in the upward extension is withdrawn by valve 61, preferably keeping the oil level below the top of partition 60, as at Y—Y.

The means shown for withdrawal of separated oil in Fig. 5 may be employed when there is a considerable differential in pressure on opposite sides of the agglomerating means as the mixture flows through conduit 50 in the direction of the arrow. The oil withdrawing means shown in Fig. 5 is also well adapted for use in cases where the oil is under pressure in conduit 50, regardless of whether there is a differential of pressure on opposite sides of agglomerating means 173. The upward extension 58 is closed as in Fig. 4 and the partition 62 extends to the top of the upward extension forming compartments 63 and 64 from which oil outlets 65 and 66 respectively lead. In each of compartments 63 and 64 there is a float 67 having a stem 68 free for vertical motion in guides 69 and carrying a valve member 70. The valve member 70 respectively controls oil discharge through outlets 65 and 66. The floats 67 are so constructed that they float in water but sink in oil and they are so arranged that the dividing line between oil and water is kept at a level Z—Z that will prevent escape of water.

While I have described certain embodiments of my invention in particular detail it is to be understood that I do not intend to limit my invention to such details but that it shall include such variations and modifications as fall within the hereunto appended claims. In this connection it is to be understood that centrifugal separation may be employed in the performance of any step that is described herein as being performed by subsidence under gravity.

I claim:

1. In the separation of mixtures of immiscible liquids in which one liquid is present in fine particles, the steps comprising mechanically coalescing particles of one liquid from a continuous body of the liquid immiscible with the first liquid by passing the mixture through unobstructed passages of such small transverse dimension that the smallest particles of the first liquid to be removed from the mixture will contact with the walls of the passage and be caused to coalesce with other bodies of the first liquid, and separating coalesced bodies of the first liquid by difference of specific gravity.

2. In the separation of a mixture of immiscible liquids in which one liquid is in small separate particles, the steps comprising passing the mixture through unobstructed passages of such small transverse dimension that the smallest particles to be removed will contact with the walls of the passage and thereby mechanically coalescing particles of one liquid from a continuous body of an immiscible liquid, and separating by difference of specific gravity coalesced bodies of the first liquid.

3. In the separation of mixtures of immiscible liquids, the steps comprising maintaining a body of the mixture, feeding fresh quantities of mixture to said body at one side thereof, withdrawing the lighter constituent from the top of said body, and passing from said body the heavier constituent and any of the lighter constituent admixed therewith laterally through upwardly-opening passages of such small transverse dimension that the smallest particles of the lighter constituent that are to be removed will contact with the walls of the passage and be caused to coalesce with other particles of the lighter constituent.

4. In the separation of mixtures of immiscible liquids the steps comprising maintaining a plurality of bodies of liquid, supplying fresh mixture to a first one of said bodies, passing the mixture successively from one of said bodies to another through unobstructed passages of such small transverse dimension that the smallest particles of a constituent to be removed will contact with the walls of the passage and become agglomerated, withdrawing the lighter constituent from the top of each of said bodies, and withdrawing the heavier constituent from a lower level of the last of said bodies.

5. In the separation of mixtures of immiscible liquids, the steps comprising passing the mixture laterally through unobstructed passages sufficiently narrow to insure contact with particles of a dispersed constituent with a wall of said passages and thereby agglomerating fine particles of a constituent, withdrawing the agglomerated constituent from the mixture at both ends of said passages.

6. In the separation of mixtures of immiscible liquids, the steps comprising passing the mixture laterally through unobstructed passages sufficiently narrow to insure contact with particles of a dispersed constituent with a wall of said passages and thereby agglomerating fine particles of a constituent, permitting globules of the agglomerated constituent to rise at either end of said passages, and withdrawing the agglomerated constituent from an upper level of the mixture.

7. Apparatus for the separation of dispersed particles of a liquid from another immiscible liquid, comprising a chamber having a mixture inlet and an outlet for one of the constituents thereof, means in said chamber between said inlet and outlet and providing a plurality of unobstructed liquid passages of such small transverse dimension that the smallest dispersed particles of liquid contained in said mixture flowing therethrough and which are sought to be removed will contact with the walls of one of said passages and be caused to coalesce with others of said particles, a partition extending upward from said means and preventing flow of liquid from said inlet to said outlet except through said passages, and means for withdrawing agglomerated particles of dispersed liquid from an upper level of said chamber on both sides of said partition.

In testimony whereof, I have signed my name to this specification.

LEO D. JONES.